United States Patent
Miyazaki et al.

(10) Patent No.: US 9,782,794 B2
(45) Date of Patent: Oct. 10, 2017

(54) FINGERPRINT-ERASING CURED FILM, METHOD FOR MANUFACTURING SAME, DISPLAY AND TOUCH PANEL USING SAME, AND ELECTRONIC DEVICE USING THESE

(71) Applicant: TSUJIDEN CO., LTD., Suginami-ku, Tokyo (JP)

(72) Inventors: Akira Miyazaki, Omura (JP); Yasunori Mori, Omura (JP); Koichi Kubo, Omura (JP); Haruya Kakuta, Omura (JP)

(73) Assignee: TSUJIDEN CO., LTD., Tokyo (JP)

(*) Notice: Subject to any disclaimer, the term of this patent is extended or adjusted under 35 U.S.C. 154(b) by 517 days.

(21) Appl. No.: 14/186,000

(22) Filed: Feb. 21, 2014

(65) Prior Publication Data

US 2014/0167332 A1 Jun. 19, 2014

Related U.S. Application Data

(62) Division of application No. 13/322,805, filed as application No. PCT/JP2010/059285 on Jun. 1, 2010, now abandoned.

(30) Foreign Application Priority Data

Jun. 1, 2009 (JP) ................ 2009-132541

(51) Int. Cl.
*B05D 5/02* (2006.01)
*B05D 3/06* (2006.01)
(Continued)

(52) U.S. Cl.
CPC ................ *B05D 5/02* (2013.01); *B05D 1/42* (2013.01); *B05D 3/067* (2013.01); *B29C 35/10* (2013.01);
(Continued)

(58) Field of Classification Search
CPC . B05D 5/02; B05D 3/067; B05D 1/42; B05D 3/0254; B29C 35/10; G02B 27/0006; G02B 5/02; C08J 5/18; Y10T 428/249978
(Continued)

(56) References Cited

U.S. PATENT DOCUMENTS 5,723,262 A * 3/1998 Nakamura ................ C08F 8/00
430/286.1
6,074,741 A * 6/2000 Murata .................... B32B 27/08
428/206
(Continued)

FOREIGN PATENT DOCUMENTS

JP H05-271460 A 10/1993
JP H06-100725 A 4/1994
(Continued)

OTHER PUBLICATIONS

Office Action dated Jun. 24, 2014 for corresponding Japanese Patent Application No. JP 2011-518458.

*Primary Examiner* — Nahida Sultana
(74) *Attorney, Agent, or Firm* — Bruzga & Associates; Charles E. Bruzga; Shlomo S. Moshen

(57) ABSTRACT

Fingerprint-erasing cured films for rendering fingerprint depositions on various surfaces quickly less visible, or invisible; a manufacturing method therefor; a display or touch panel using the same; and electronic devices using these are provided. A liquid coating film including a solvent and a polymerizable resin composition curable by an activating energy beam is formed. In a state of the solvent being included within the film, the film is cured to form a cured film containing the solvent, preferably using a release material whose surface has undergone matte processing; and the solvent is evaporated in a subsequent drying step, whereby a cured film with a multitude of micropores on the surface is formed. Fingerprint soiling is rendered not readily visible (Continued)

or invisible. By using the cured film, there are obtained displays, touch panels, and electronic devices having fingerprint-erasability. To improve fingerprint-erasability, adding a water-absorbent compound to the film composition is preferable.

3 Claims, 8 Drawing Sheets

(51) Int. Cl.
  *B05D 1/42*    (2006.01)
  *C08J 5/18*    (2006.01)
  *G02B 27/00*   (2006.01)
  *B29C 35/10*   (2006.01)
  *B05D 3/02*    (2006.01)
  *G02B 5/02*    (2006.01)

(52) U.S. Cl.
  CPC ............ *C08J 5/18* (2013.01); *G02B 27/0006* (2013.01); *B05D 3/0254* (2013.01); *G02B 5/02* (2013.01); *Y10T 428/249978* (2015.04)

(58) Field of Classification Search
  USPC ........................................................ 264/495
  See application file for complete search history.

(56) References Cited

U.S. PATENT DOCUMENTS

| | | | | |
|---|---|---|---|---|
| 6,245,421 B1* | 6/2001 | Aurenty | ................ | B41C 1/1066 427/152 |
| 6,399,277 B1* | 6/2002 | Nojima | ................... | G03F 7/032 430/280.1 |
| 7,144,544 B2* | 12/2006 | Bulluck | ................ | C08F 265/06 264/494 |
| 8,609,742 B2* | 12/2013 | Wakita | .................... | G03F 7/032 522/113 |
| 2001/0041242 A1* | 11/2001 | Hayashida | ............. | G11B 7/252 428/64.4 |
| 2002/0135103 A1* | 9/2002 | Odorzynski | ...... | A61F 13/15593 264/442 |
| 2006/0035060 A1* | 2/2006 | Koyama | ................. | C08J 7/047 428/141 |
| 2006/0257760 A1* | 11/2006 | Mori | ..................... | G03F 7/2041 430/7 |
| 2009/0295003 A1* | 12/2009 | Noro | ................... | C08G 59/688 264/1.38 |
| 2010/0129587 A1* | 5/2010 | Terauchi | ............... | C08F 220/22 428/65.1 |
| 2010/0272886 A1* | 10/2010 | Vaes | .................. | C08G 18/4063 427/140 |

FOREIGN PATENT DOCUMENTS

| | | |
|---|---|---|
| JP | H08-099029 A | 4/1996 |
| JP | 2007-058162 A | 3/2007 |
| JP | 2008-197320 A | 8/2008 |
| JP | 2008-247012 A | 10/2008 |
| JP | 2009-025734 A | 2/2009 |
| JP | 2009-109683 A | 5/2009 |
| WO | 2004/046230 A1 | 6/2004 |

\* cited by examiner

FINGERPRINT-ERASING CURED FILM, METHOD FOR MANUFACTURING SAME, DISPLAY AND TOUCH PANEL USING SAME, AND ELECTRONIC DEVICE USING THESE

CROSS REFERENCE

This application is a divisional application of U.S. patent application Ser. No. 13/322,805 which entered a national phase of PCT Application filed on Jun. 1, 2010, (Application No. PCT/JP2010/059285), which claimed the priority of JP Patent Application filed on Jun. 1, 2009 (Application No. JP 2009-132541). The entire contents of the applications are incorporated herein by reference.

TECHNICAL FIELD

The present invention relates to a cured film having the effect of making soiling from fingerprints adhering thereto less noticeable or no longer visible within a short time period, the film being formable by ordinary methods, such as adhesion, transfer, or coating, onto surfaces of displays of electronic devices such as personal computers, mobile telephones, car navigation systems, ATMs, cash dispensing machines, and the like; onto displays of such electronic devices having a touch panel function; onto electronic devices in which these are used; or onto surfaces of furniture, electronic products, toys, stationery, glass, lenses, wood, and other mirror-finish surfaces whose aesthetic appearance is diminished by fingerprints or other forms of sebaceous soiling. The present invention also relates to a method for manufacturing same; to a display or touch panel using same; and to electronic devices and the like in which these are used.

BACKGROUND ART

By virtue of being touched, the surfaces of the aforedescribed displays, furniture, electronic products, toys, glass, and the like are susceptible to being scratched, and to being soiled by lipids and the like from the hands, which tends to diminish their appearance. In particular, in the case of touchpad-type mobile telephones, mobile music playback devices, and the like, fingerprint soiling is severe owing to the fact that the display face is touched frequently by the fingers. Moreover, fashion can sometimes make it desirable for not only the display face, but for the electronic device as well, to have a finish such as a mirror coating or the like, in which instance sebaceous soiling from fingerprints will be a significant problem for the case portion as well. A typical countermeasure taken in the past against sebaceous soiling from fingerprints or the like is to give film surfaces a soil-resistant finish of a fluorine-based or silicone-based soil-resistant material, so that sebum does not adhere. Also, measures are taken to facilitate removal of fingerprint soiling deposited on film surfaces, by wiping using a cloth or the like.

However, these anti-soiling films may, for example, have minute asperities formed on the surface so as to prevent reflection of outside light and scratches from becoming noticeable, and a problem is presented in that, on having adhered, soiling matter can penetrate into the asperity surfaces, giving the film surface a cloudy appearance even if an attempt is made to wipe it away.

To address this problem, Japanese Laid-open Patent Application No. 2007-58162 (Patent Document 1) discloses an invention for making fingerprints unnoticeable, by fabricating surface asperities using a lipophilic resin, so that even if soiling such as fingerprints or the like are produced on the film, the fingerprint lipid components and the like are diffused and transported across the film surface utilizing capillary action; however, traces of deposited fingerprints are recognizable at the visual level, and the performance is not satisfactory.

Japanese Laid-open Patent Application No. 2001-353808 (Patent Document 2) discloses a method for causing soiling matter to blend in and become unnoticeable by imparting lipophilicity to a coating film which sheaths the surface of an electronic device; however, a problem with this method is that it takes an extended period, namely, several days, to render soiling unnoticeable.

Japanese Laid-open Patent Application No. 2004-230562 (Patent Document 3) discloses a method of furnishing a hard coat layer by irradiating a radiation-sensitive type resin composition using ultraviolet radiation or the like to bring about curing, followed by surface treatment employing an alkaline aqueous solution; however, this method involves a complicated surface treatment step, and the scope of utilization is limited due to the surface treatment using an alkaline aqueous solution.

Japanese Laid-open Patent Application No. 2006-43919 (Patent Document 4) discloses a method for manufacturing a hard coat film by applying an energy beam-curing hard coat composition onto a release film having surface roughness Ra of 0.1 μm or less; and, after drying, affixing the coated film to a substrate film, heating the assembly, and then irradiating the assembly using ultraviolet radiation or the like to bring about curing. However, because the method involves making the surface smooth in order to improve the ease of wiping away fingerprints, a problem is presented in that the method cannot be utilized in cases where a surface is furnished with fine surface asperities to prevent reflection of outside light and the like.

PRIOR ART DOCUMENTS

Patent Documents

Patent Document 1: Japanese Laid-open Patent Application No. 2007-58162
Patent Document 2: Japanese Laid-open Patent Application No. 2001-353808
Patent Document 3: Japanese Laid-open Patent Application No. 2004-230562
Patent Document 4: Japanese Laid-open Patent Application No. 2006-43919

DISCLOSURE OF THE INVENTION

Problems to be Solved by the Invention

In order to address the aforedescribed problems, the present invention provides a fingerprint-erasing cured film (herein also termed a "film") capable of erasing soiling caused by deposition of fingerprints on displays of various kinds of electronic devices or on the surfaces of devices or the like, so that within a short period of time, e.g., 5 minutes, the fingerprint soiling is erased to the point of being no longer visible. The present invention also provides a method for the manufacture of same; a display or touch panel in which same is used; and to electronic devices and the like in which these are used.

Means Used to Solve the Above-Mentioned Problems

In order to attain the aforedescribed object, the present invention has the following means.

Specifically, the invention according to a first aspect is a method for manufacturing a fingerprint-erasing cured film, characterized in that there is formed a film including at least a resin-forming composition and a solvent, the resin-forming composition being polymerizable using an activating energy beam; curing of the film is brought about in a state of the solvent being included within the film; and the cured film is subsequently dried.

The inventors discovered that during manufacture of a cured film by curing a coating liquid film of an activating-energy-beam-polymerizable resin-forming composition by irradiating same with a activating energy beam, by bringing about curing in a state with the solvent included [within the film] (*1), the solvent, which does not participate in curing, remains present in a widely dispersed state within the cured film. When this solvent is evaporated through forced drying or natural drying, there is obtained a cured film in which there have formed a multitude of micropores (hereinafter also termed "solvent evaporation micropores") of a size too small to be visible, for example, from several microns to several tens of nanometers, which open onto the cured film surface and communicate with the film interior from the surface of the cured film. It is hypothesized that these solvent evaporation micropores [are formed] during the actual curing of the activating-energy-beam-polymerizable resin-forming composition, as the cured resin-forming component and the solvent undergo phase separation, and as in the subsequent drying step the solvent passes through the film interior and evaporates from the film surface, forming pores. It is hypothesized that in the cured film of the present invention, by virtue of the communicating micropores from the surface to the film interior, there arises capillary action which draws fingerprint components deposited on the film surface into the film interior, and transports the fingerprint soil components into the micropores, whereby the fingerprints are no longer readily visible, or rendered invisible. Herein, the effect of making [fingerprints] "no longer readily visible, or invisible" is expressed as "fingerprint-erasing ability," and is evaluated with the frequency disclosed below.

The inventors discovered that while this fingerprint-erasing effect is exhibited even with the cured film surface left in a clear [state], the fingerprint-erasing effect is enhanced further by manufacturing the cured film while using, during formation of the cured film, a release material subjected to an embossing or matting process (hereinafter termed a "matting process") created through sandblasting of the surface or the like. Specifically, it was discovered that when forming the cured film, the surface asperities of the release material can be transferred to the film surface to form a multitude of asperity portions and to form a matte-finished cured film with minute micropores (solvent evaporation pores) formed in the asperity portions thereof, and having higher fingerprint-erasing ability than a clear film. By virtue of possessing both surface asperities and the solvent evaporation micropores, the cured film affords further improvement in fingerprint-erasing ability.

The invention according to a second aspect is "a method for manufacturing the fingerprint-erasing cured film according to the invention of the first aspect, characterized in that 5 wt % or more of the solvent is included in the film." According to this invention, a given amount or more of solvent evaporation micropores can be created, and the effect of fingerprint-erasing ability afforded by the micropores on the cured film surface is assured.

The invention according to a third aspect is "a method for manufacturing the fingerprint-erasing cured film according to the invention of the first aspect, characterized in that the film is cured in a state of 5 wt % or more and 30 wt % or less of the solvent being included in the film." The number of micropores increases with a higher solvent content, which is desirable from the standpoint of fingerprint-erasing ability, but on the other hand, excessively reduced mechanical strength of the cured film is a problem as well, and the value of 30 wt % has been established as an upper limit based on these conflicting requirements.

The invention according to a fourth aspect is "a method for manufacturing the fingerprint-erasing cured film according to the invention of any of the first through third aspects, wherein there is formed a film including at least a resin-forming composition and a solvent, the resin-forming composition being polymerizable using an activating energy beam; and, in a state of the film being sandwiched between a substrate and a release material, and the solvent being included in the film, the film is irradiated with an activating energy and cured, whereby a cured film is formed on the substrate."

The invention according to a fifth aspect is "a method for manufacturing the fingerprint-erasing cured film according to the invention of the fourth aspect, characterized in that the release material is a release material having a surface with surface asperities formed by a matting process." According to this invention, because the release material surface has surface asperities, there is obtained a cured film having surface asperities transferred to the cured film surface, and having solvent evaporation micropores formed within the surface asperities.

The invention according to a sixth aspect is "a method for manufacturing the fingerprint-erasing cured film according to any of the inventions of the first through fifth aspects, characterized in that a water-absorbent compound is further added to the resin-forming composition that is polymerizable using an activating energy beam," According to this invention, a water-absorbent compound is introduced, and therefore fingerprint-erasing ability is improved.

The invention according to a seventh aspect is "a method for manufacturing the fingerprint-erasing cured film according to the invention of the sixth aspect, characterized in that the water-absorbent compound adds 0.4 to 25 wt % of the water-absorbent compound with respect to 100 wt % of the solid fraction." (*2) This invention is a method which limits the proportion of the water-absorbent compound to the solid fraction, specifically, the solid fraction of the activating-energy-beam-polymerizable resin-forming composition.

The invention according to an eighth aspect is "a method for manufacturing the fingerprint-erasing cured film according to the invention of the sixth aspect, characterized in that the water-absorbent compound is one or two or more compounds selected from the group consisting of water-absorbent resins, oligomers containing carboxyl groups, ionic liquids, water-absorbent inorganic salts or an aqueous solution thereof, and silica gel microparticles."

The invention according to a ninth aspect is "a fingerprint-erasing cured film obtained by curing a resin-forming composition polymerizable using an activating energy beam, the fingerprint-erasing cured film characterized in that there are formed a multitude of micropores communicating with an interior of the cured film from a surface of the cured film." This cured film has good fingerprint-erasing ability.

The invention according to a tenth aspect is "a fingerprint-erasing cured film obtained by curing a resin-forming composition polymerizable using an activating energy beam, the fingerprint-erasing cured film characterized in that a surface of the cured film is matte-processed, and there are formed a multitude of micropores communicating with an interior of the cured film from a surface of the cured film having the matte-processed surface." This cured film has even better fingerprint-erasing ability. The fact that the micropores formed on the cured film surface communicate with the cured film interior from the film surface has been confirmed by measurements of refractive index as disclosed below.

The invention according to an eleventh aspect is "a fingerprint-erasing cured film according to the invention of the ninth or tenth aspect, characterized in that 6 vol % or more of the micropores communicate with the interior of the cured film from the surface of the cured film."

The invention according to a twelfth aspect is "a display, characterized by having the fingerprint-erasing cured film according to any of the inventions of the ninth through eleventh aspects formed thereon."

The invention according to a thirteenth aspect is "a touch panel, characterized by having the fingerprint-erasing cured film according to any of the inventions of the ninth through eleventh aspects formed thereon."

The invention according to a fourteenth aspect is "an electronic device characterized in that a touch panel is installed in an input section, and the fingerprint-erasing cured film of any of the inventions of the ninth through eleventh aspects is formed on a surface of the touch panel."

The invention according to a fifteenth aspect is "a mobile device, an item of furniture, a fitting, a glass, an eyeglass lens, or a mirror characterized by having the fingerprint-erasing cured film according to any of the inventions of the ninth through eleventh aspects formed thereon."

Effect of the Invention

The fingerprint-erasing cured film obtained by the manufacturing method of the present invention exhibits good fingerprint-erasing ability, such that a fingerprint deposited on a surface is not readily visible, or is rendered invisible, after a short time; for example, five minutes. It is hypothesized that the cured film obtained by the present invention exhibits an excellent fingerprint-erasing effect by virtue of fingerprint soiling deposited on a surface being drawn into the micropores which have been opened onto the cured film surface through evaporation of a solvent, and which communicate with the cured film interior.

As the amount of solvent included in the film coating liquid to be cured increases, the micropores within the cured film become more numerous, and fingerprint-erasing ability is enhanced. On the other hand, if the amount of solvent included is too great, the amount of the solid fraction included will decrease to the point that the mechanical strength of the film declines. The solvent content of the cured film coating liquid is preferably 5 wt % or more and 30 wt % or less, for example.

The release material having surface asperities created by matte processing is pressed against the coated film to form the cured film, whereby there is obtained a cured film with asperity portions transferred to the cured film surface, and moreover having a multitude of micropores formed on the matte-processed surface thereof. With this cured film, forming asperity portions by matte processing of the cured film increases the relative surface area of the cured film surface, and in accordance therewith, the number of micropores increases as well, so that the number of micropores increases as compared with the case where solvent evaporation micropores are formed in a cured film with a clear (smooth) surface, and fingerprint-erasing ability is enhanced further.

As a touch panel or the like is touched with the fingers a greater number of times, the fingerprint-erasing effect of the present invention progressively declines, and fingerprint soiling on the film surface becomes noticeable. However, fingerprint soiling can be eliminated easily by wiping the film surface with a commercially available wet wipe, a cloth product containing water, or the like, at a frequency of, for example, once every several days, whereby good fingerprint-erasing ability may be restored.

DESCRIPTION OF THE NUMERICAL SYMBOLS

Figure 1:
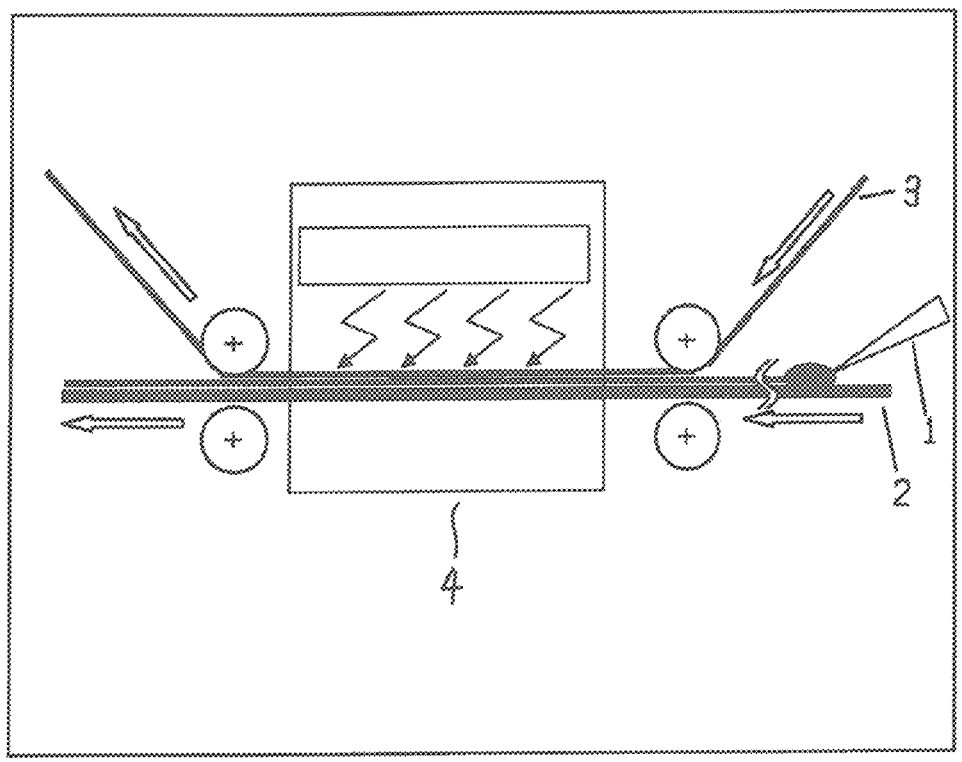
FIG. 1 is a schematic view of an apparatus for manufacturing a fingerprint-erasing cured film on a sheet material.

1: coating port
2: sheet material (substrate)
3: release film
4: activating energy beam exposure device

BEST MODE FOR CARRYING OUT THE INVENTION

Known ultraviolet-curing resin compositions, electron beam-curing resin compositions, and the like can be mentioned as examples of the activating-energy-beam-polymerizable resin composition employed in the present invention.

By way of specific examples, there can be mentioned urethane acrylate based resin compositions, polyester acrylate based resin compositions, epoxy acrylate based resin compositions, polyol acrylate based resin compositions, epoxy resin compositions, and the like, or blends of these resin compositions. Copolymers of these resin compositions with polyether acrylate based oligomers, polyoxyalkylene glycol acrylate based oligomers, or other oligomers are also acceptable.

As examples of acryl urethane based resin compositions there can be mentioned compositions that contain products obtained by reacting a polyester polyol with an isocyanate monomer or prepolymer; acrylate based monomers having hydroxyl groups, such as 2-hydroxyethyl acrylate, 2-hydroxyethyl methacrylate (hereinafter, acrylates are assumed to encompass methacrylates and will be denoted as acrylates only), 2-hydroxypropyl acrylate, and the like; and, optionally, a photopolymerization initiator.

As examples of polyester acrylate based compositions there can be mentioned compositions that contain a polyester polyol, a 2-hydroxyethyl acrylate or 2-hydroxy acrylate based monomer, and, optionally, a photopolymerization initiator.

As examples of epoxy acrylate based compositions there can be mentioned epoxy acrylate oligomers, to which are added a reactive diluent or a photoreaction initiator.

As examples of polyol acrylate based compositions there can be mentioned trimethylol propane triacrylate, di(trimethylol propane)tetraacrylate, pentaerythritol triacrylate, pentaerythritol tetraacrylate, dipentaerythritol hexaacrylate, alkyl-modified dipentaerythritol pentaacrylate, and the like, to which may be optionally added a photopolymerization initiator or the like.

As examples of polyether acrylate based oligomers, there can be mentioned polyethylene glycol diacrylate, polypropylene glycol diacrylate, polypropylene glycol dimethacrylate, and other polyalkylene glycol acrylic acid or methacrylic acid esters. As examples of polyoxyalkylene glycol acrylate based oligomers, there can be mentioned polyoxypropylene glycol diacrylate and polyoxypropylene dimethacrylate.

As specific examples of photoreaction initiators, there can be mentioned benzoin and derivatives thereof, acetophenone, benzophenone, hydroxybenzophenone, Michler's ketone, α-amyloxime ester, thioxanthone, and the like, and derivatives of these. Concomitant use with a photosensitizer is acceptable. The aforedescribed photoreaction initiators can also be used as photosensitizers. Also, when using an epoxy acrylate based photoreaction initiator, a sensitizer such as n-butylamine, triethylamine, tri-n-butylphosphine, or the like can be mentioned as examples.

The solvent employed together with the activating-energy-beam-polymerizable resin composition may be any known solvent which is employed as the solvent for the resin composition; as examples, there can be mentioned, for example, methyl ethyl ketone, methyl isobutyl ketone, and other ketone based organic solvents; ethyl acrylate, butyl acrylate, ethyl ethyoxypropionate, and other ester based organic solvents; and isopropyl alcohol, butyl alcohol, methyl cellosolve, and other alcohol based organic solvents.

According to the present invention, once the polymerizing resin coating liquid film is irradiated with an activating energy beam in a state containing a solvent, to bring about curing, the solvent, which does not participate in curing, is present in a widely dispersed state within the cured film. This solvent is subsequently evaporated through forced or natural drying. There is obtained thereby a cured film in which there have formed a multitude of solvent evaporation micropores (micropores) of a size too small to be visible, for example, a pore diameter of from several microns to several tens of nanometers, which open onto the cured film surface and communicate with the film interior.

During curing, as the amount of solvent included in the coating liquid increases from a level of 5 wt %, the micropores become more numerous, and fingerprint-erasing ability is enhanced. On the other hand, the film strength of the cured film becomes weaker, and therefore in consideration of a balance between the two, it is preferable to establish an appropriate upper limit for amount of solvent included. This upper limit for the amount of solvent included is a value that may be selected appropriately by the practitioner depending on the film material being used, from the standpoint of strength retention of the film; in preferred practice, it is typically 30 wt % or less. The level of pencil hardness of the cured film is not particularly limited, and the cured film is broadly defined to encompass so-called hard coat films.

According to the present invention, it is necessary for the solvent to be included within the coating liquid film after curing. When the solvent is contained, micropores that communicate with the cured film surface from the cured film interior are formed through evaporation of the solvent in the drying process subsequent to curing. For example, where a solvent content of 5 wt % or more (a solid fraction of 95 wt % or less) is used, as a result of the greater amount of the solvent, the number of micropores increases and fingerprint-erasing ability is enhanced. If the amount of solvent included during curing is too small, micropores do not form in sufficient numbers in the cured film, and the fingerprint-erasing effect is small. Also, even if the solvent remains in the micropores, fingerprint-erasing action will be exhibited as long as miscibility with fingerprint soil components is good.

As methods for manufacturing the fingerprint-erasing cured film there may be cited (1) a method of coating a coating liquid including the activating-energy-beam-polymerizable resin composition and the solvent onto a substrate by bar coating, die coating, spin coating, or the like, then, with the amount of solvent included brought to within a predetermined range, irradiating with an activating energy beam to bring about curing, followed by drying; and (2) a method of coating an activating-energy-beam-polymerizable resin composition onto a release material such as glass, a resin film, a mold, or the like by die coating or roll coating, pressing it against the coating face of the release material which has undergone the aforedescribed matte processing, and then with the amount of solvent included brought to within a predetermined range, irradiating with an activating energy beam to bring about curing, followed by drying (transfer method).

In preferred practice, evaporation of the solvent is carried out after irradiation with an activating energy beam to bring about curing. However, even if a portion of the solvent evaporates prior to irradiation, micropores will form as long as a prescribed amount of the solvent is included during curing, and accordingly there is no intention to exclude from the manufacturing method of the present invention a manufacturing method with an additional process for carrying out forced evaporation of the solvent prior to irradiation. Solvent evaporation subsequent to curing takes place most reliably through forced drying by heating or the like, but depending on the amount of solvent included, natural drying of the cured film on the manufacturing line is also an option, and forced drying is not essential. While fingerprint-erasing ability is high with residual solvent, there may be a strong solvent odor, and therefore [appropriate] drying conditions should be selected.

It is also acceptable to give the release material a smooth surface to make the cured film surface clear (smooth), and to then form the solvent evaporation micropores through solvent evaporation. Further, in preferred practice, the surface of the release material is furnished with a profile of asperities by matte processing, so that when this presses against the surface of the film to be cured to form the cured film, the multitude of asperity portions can be transferred to the cured film surface, and so that there can be can be formed solvent evaporation micropores which open onto this matte-processed surface and communicate with the cured film interior. A cured film having a matte-processed surface affords further improvement in fingerprint-erasing action, relative to a cured film having a clear surface. In cases where the release material surface is furnished with a profile of asperities in this manner, the average surface roughness Ra can be selected appropriately within a range of from 0.1 to 5 µm, for example.

Also, in a case where a fingerprint-erasing cured film is formed continuously on a sheet material (substrate), as shown in FIG. 1, a coating liquid containing an activating-energy-beam-polymerizable resin composition and a solvent is coated onto a sheet material (substrate) 2 from a coating liquid coating outlet 1 furnished between the substrate 2 and a release film 3; the activating-energy-beam-polymerizable resin composition is cured with an activating energy beam exposure device while the cured film is sandwiched between the substrate 2 and the release film 3; and subsequently the release film 3 is peeled away, then the solvent is dried forcibly or naturally, thereby forming a cured film having micropores in the cured film surface.

Figure 2:
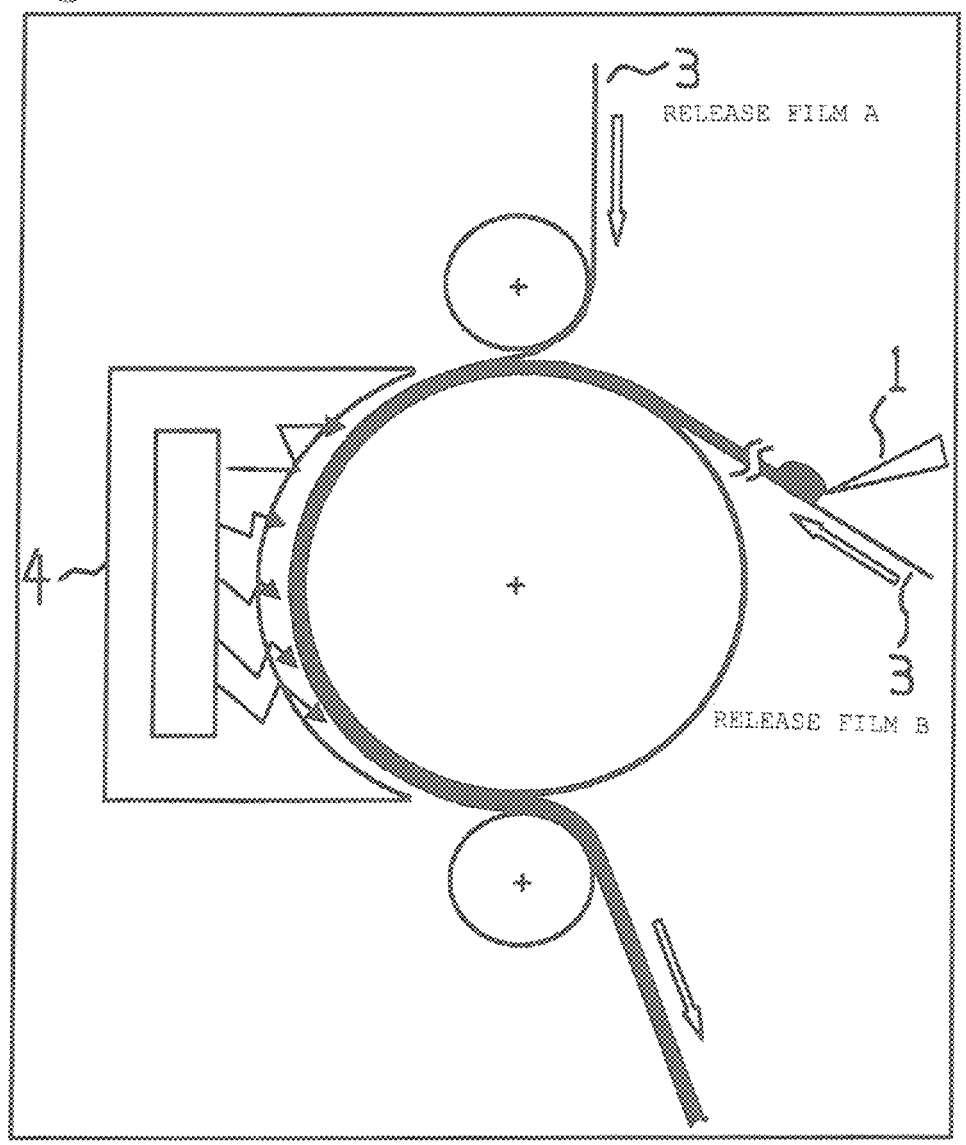
FIG. 2 is a schematic view of an apparatus for manufacturing a fingerprint-erasing cured film on a release material.

Further, in cases where the surface of a substrate on which it is desired to form a fingerprint-erasing cured film cannot be coated directly, there may be cited a method of employing two release films of different levels of cohesive force with the cured film. As shown in FIG. 2, first, the coating liquid is coated between a release film A with strong cohesive force with the cured film and a release film B with weak cohesive force, and the coating film is irradiated with an activating energy beam to bring about curing. Subsequent to curing, the release film B with weak cohesive force is peeled off, an adhesive is coated onto the surface from which the release film B was peeled, and the soil-resistant film is caused to adhere through the agency of the adhesive to a surface it is desired to protect. By subsequently peeling off the release film A, a fingerprint-erasing film can be formed on the surface it is desired to protect.

In this method, the release film A with strong cohesive force corresponds to the substrate in the aforedescribed manufacturing method, and the release film B corresponds to the release material.

In the present invention, water-absorbent compounds may be employed for further improvement of fingerprint-erasing ability. As examples of water-absorbent compounds, there may be cited water-absorbent resins, carboxylic acid-containing oligomers, ionic liquids, water-absorbent inorganic salts or aqueous solutions thereof, and silica gel microparticles. From the standpoint of hardness and transparency of cured films, polyalkylene oxide based or polyacrylic-acid-based water-absorbent resins, carboxylic acid-containing oligomers, or ionic liquids are especially preferred.

As examples of water-absorbent resins, there may be cited acrylic-acid-based water-absorbent resins, polyalkylene-oxide-based water-absorbent resins, acrylamide-based water-absorbent resins, polyvinylamine-based water-absorbent resins, and the like.

As examples of carboxylic-acid-containing oligomers, there may be cited acrylic acid-acrylic ester copolymer oligomers, polybasic-acid-modified acrylate oligomers, and the like.

Ionic liquids, also called normal-temperature molten salts, are compounds composed of ionic species only, and are liquid at normal temperature. As cations in ionic liquids, there may be cited, for example, pyrrolidinium and other amidinium cations, guanidium cations, tertiary ammonium cations, and the like. As anions in ionic liquids, there may be cited, for example, carboxylic acids, sulfuric acid esters, higher alkyl ether sulfate esters, sulfonic acid or phosphoric acid esters, or other esters; and fluoroboric acid, tetrafluoroboric acid, perchloric acid, hexafluorophosphoric acid, hexafluoroantimonic acid, hexafluoroarsenic acid, and other inorganic acids.

As water-absorbent inorganic salts, there may be cited, for example, sodium chloride, calcium chloride, magnesium chloride, calcium carbonate, and other inorganic salts, as well as saturated aqueous solutions of these, or aqueous solutions of high concentration approaching saturation.

The added amount of the water-absorbent compound is, for example, from 0.4 to 25 weight parts per 100 weight parts of the solid fraction of the coating liquid.

In cases where the water-absorbent compound does not dissolve, or dissolves with difficulty, in the solvent of the activating-energy-beam-polymerizable resin composition, the water-absorbent compound can be dissolved or suspended in water or another organic solvent in advance, then added.

WORKING EXAMPLES

While the present invention is described below through working examples and comparative examples, the present invention is not limited to the working examples.

Working Example 1

(Preparation of Water-Absorbent Resin Composition)

3 weight parts of a polyalkylene oxide based water-absorbent resin (AQUACALK made by Sumitomo Seika Chemicals), 6 weight parts of purified water, and 24 weight parts of isopropyl alcohol were mixed to prepare a water-absorbent resin composition (PA) of gel form including water-absorbent resin in an amount of about 9 wt %.

(Preparation of Coating Liquid)

A coating solution was prepared by adding ethyl 3-ethoxypropionate (EEP: solvent) to a polymerizing composition composed of 55 weight parts of a tri- or tetrafunctional pentaerythritol based ultraviolet-curing resin (PETA: made by Daicel-Cytec Co.), 45 weight parts of polyalkylene glycol diacrylate (ARONIX M-270): M270 made by Toagosei Co. Ltd.), 3 weight parts of a radical polymerization initiator (IRGACURE 184: 1-hydroxycyclohexyl phenyl ketone: made by Ciba Specialty Chemicals), and 5 weight parts of the aforedescribed water-absorbent resin composition (about 0.45 weight part on a water-absorbent resin content conversion basis), bringing the solid fraction to 90 wt %.

(Fabrication of Release Material)

A steel sheet was subjected to hard chrome plating to a thickness of 30 µm, processed to a mirror finish with average surface roughness of 0.02 µm or less, and the chrome-plated surface was then matte processed by sandblasting to prepare a metal sheet release material.

(Film Formation)

The aforedescribed coating liquid was coated to a thickness of 5 µm onto the matte-processed surface of the aforedescribed metal sheet, a polyethylene terephthalate film (A4300 made by Toyobo Co. Ltd., thickness 125 µm) serving as the substrate was pressed against the coated face, and the resin composition was irradiated with ultraviolet to bring about curing, without forced drying. The cured film obtained thereby was naturally dried, and the average surface roughness was measured at 0.7 µm.

(Evaluation of Fingerprint-Erasing Effect)

As the method for evaluating fingerprint-erasing ability, because methods involving direct application of fingerprints lack objectivity owing to differences among individuals, and to differences depending on physical condition even for the same individual, a simulated fingerprint liquid was used. For the simulated fingerprint liquid, a standard liquid composition (6.1 weight parts oleic acid, 47.5 weight parts jojoba oil, 29.3 weight parts olive oil, and 17.1 weight parts squalane) was prepared.

Figure 3:
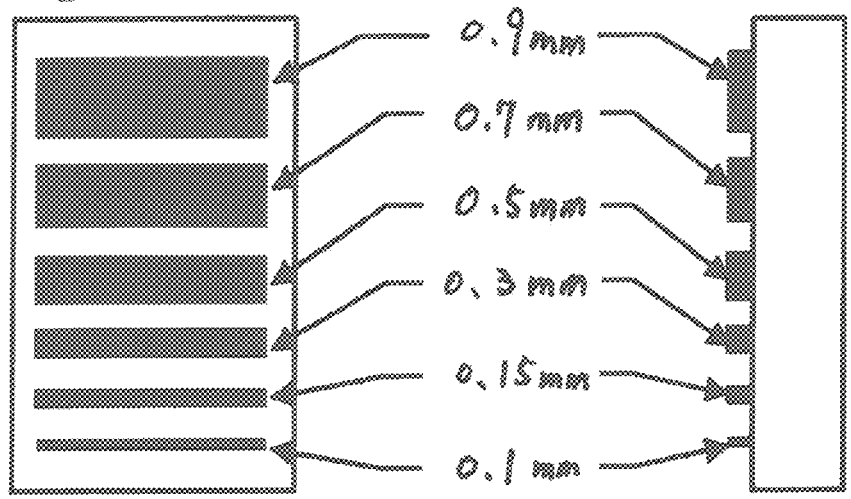
FIG. 3 is a schematic view of a stamp employed for testing to evaluate fingerprint-erasing effect.

For an evaluation stamp, a stamp that can imprint lines with line widths of 0.9 mm, 0.7 mm, 0.5 mm, 0.3 mm, 0.15 mm, and 0.1 mm was fabricated (FIG. 3). Erasure of wider lines within a shorter time can be evaluated as indicative of higher fingerprint-erasing ability.

The evaluation stamp was thoroughly loaded with the aforedescribed simulated fingerprint liquid, the aforedescribed stamp was pressed four times against commercially available copy paper, and was subsequently pressed against the anti-soiling film surface being evaluated, and left there for 5 minutes. The extent to which white lines of the simulated fingerprint liquid were no longer visible was evaluated according to the following criteria.

NG: all lines failed to disappear after 5 minutes
C: lines of 0.1 mm width were no longer visible after 5 minutes
B: lines of 0.15 mm width were no longer visible after 5 minutes
A: lines of 0.3 mm width were no longer visible after 5 minutes
S: all portions were no longer visible within 5 minutes
SS: all portions were no longer visible within 2 minutes
SS+: all portions were no longer visible within 1 minute The fingerprint-erasing effect of the cured film of Working Example 1 was evaluated and found to be SS.

Comparative Example 1

A resin composition was prepared in the same manner as in Working Example 1, except that (Film formation) was modified as follows. Using a polyethylene terephthalate film (A4300 made by Toyobo Co. Ltd., thickness 125 μm) as the substrate and employing a bar coating method, the aforedescribed coating liquid was coated onto the substrate to a thickness of 5 μm. Subsequent to coating, the substrate was passed through an oven and heated for 10 minutes at 60° C. to eliminate the solvent. After forcible drying of the solvent, the coated film was irradiated with ultraviolet to cure. The fingerprint-erasing effect of this cured was evaluated and found to be NG.

Working Examples 2 to 4, Comparative Example 2

Figure 5:
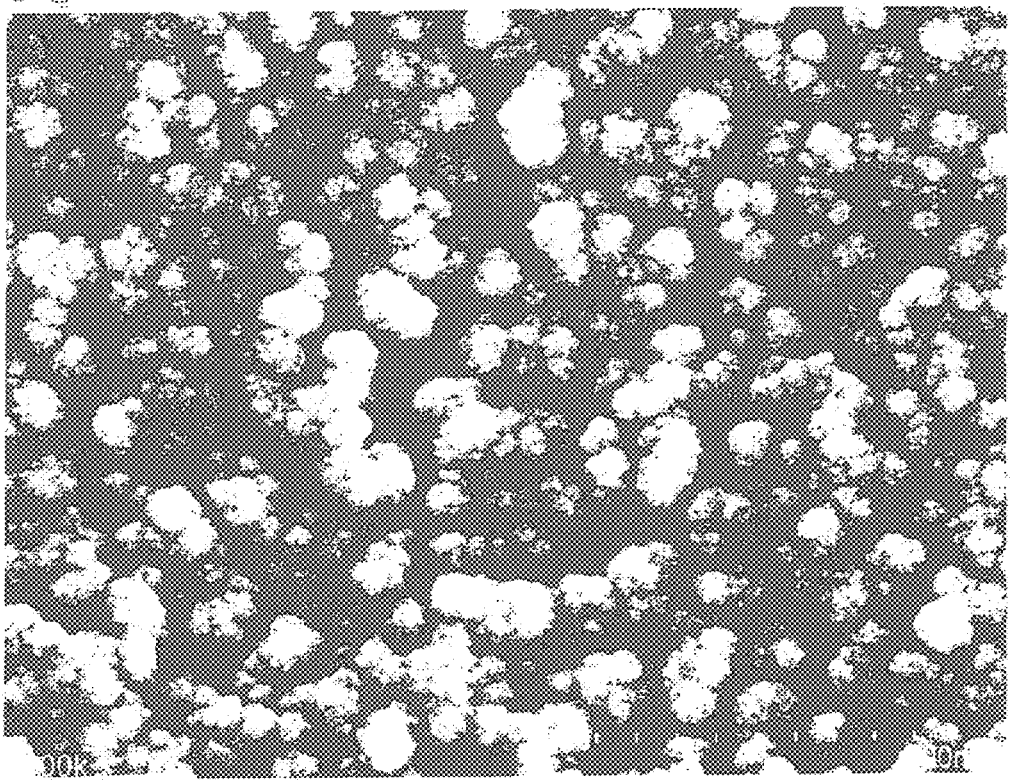
FIG. 5 is an SEM photograph of a cross section of the fingerprint-erasing cured film obtained in Working Example 4.
Figure 6:
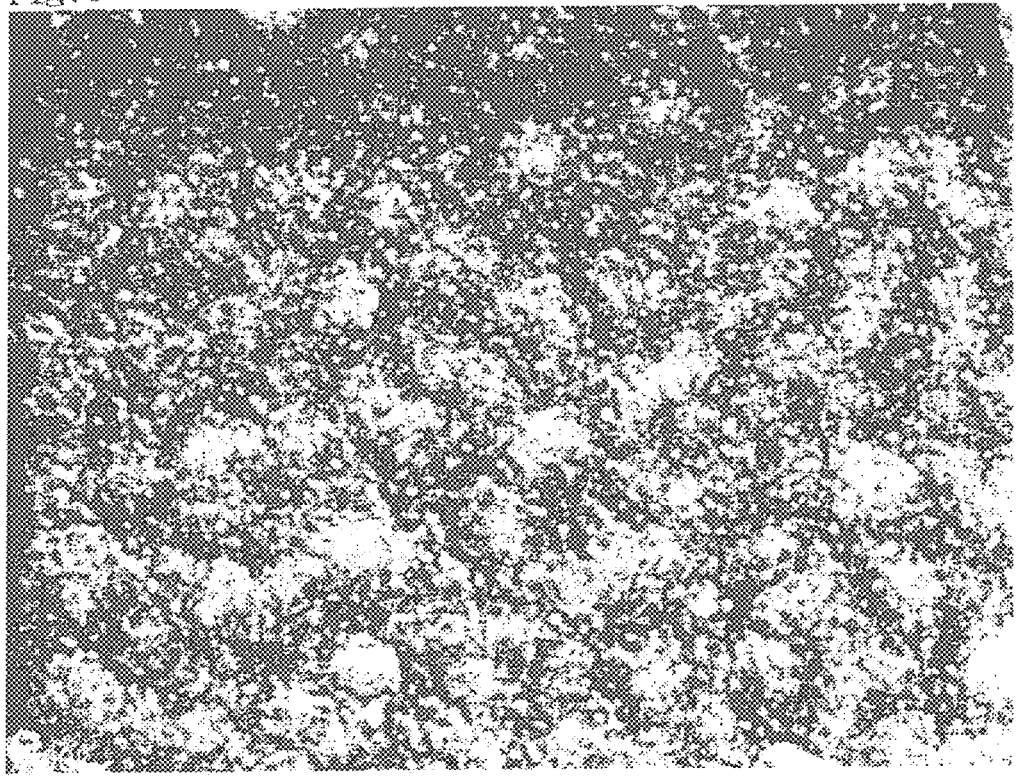
FIG. 6 is an SEM photograph of a surface of a fingerprint-erasing cured film obtained in Comparative Example 2.
Figure 7:
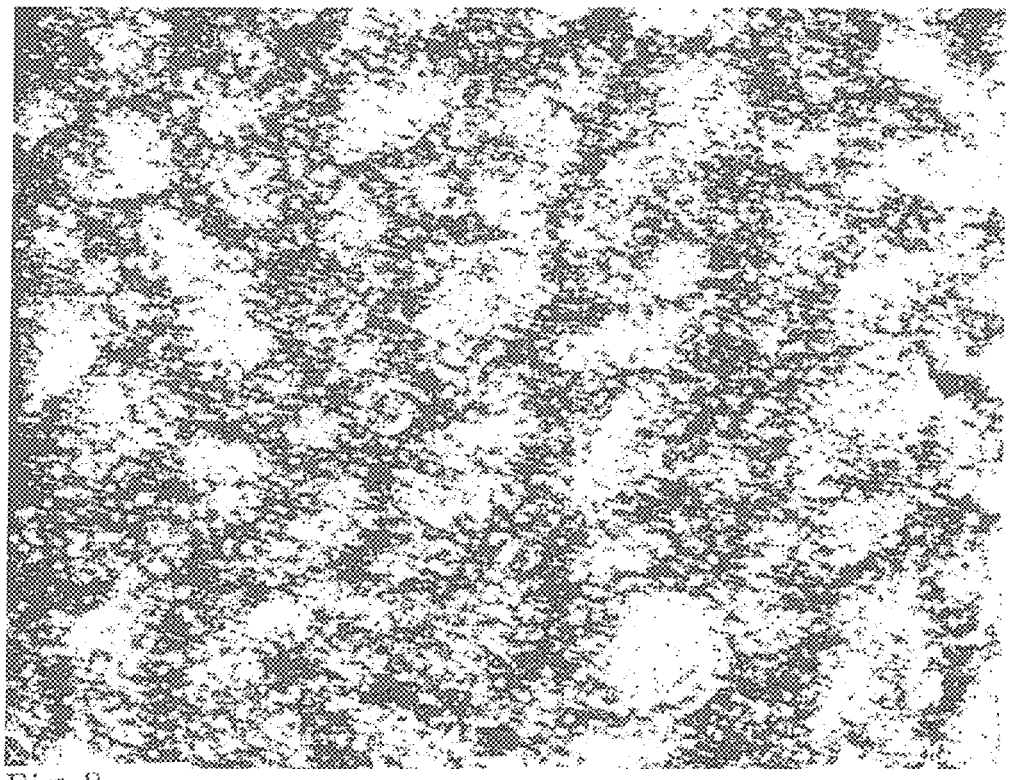
FIG. 7 is an SEM photograph of a cross section of the fingerprint-erasing cured film obtained in Comparative Example 2.
Figure 8:
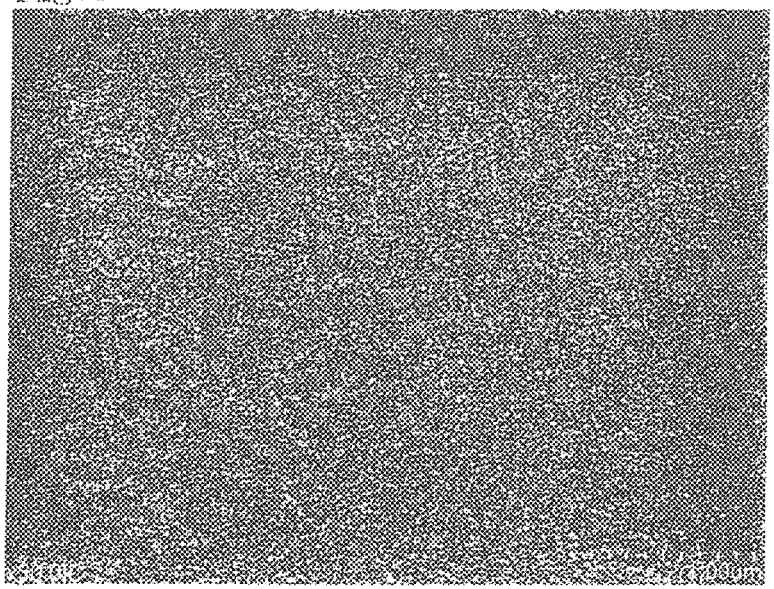
FIG. 8 is an SEM image of the surface of a film A.

Coating liquids were prepared in the same manner as in Working Example 1, except for varying the solvent content to bring the solids content within the coating films at the time of ultraviolet irradiation of Working Example 1 to the values disclosed in Table 1. Results are shown in Table 1. Electron microscope (SEM) photographs of the cured film obtained in Working Example 4 are shown in FIG. 4 (surface) and FIG. 5 (cross section), while SEM photographs of the cured film obtained in Comparative Example 2 are shown in FIG. 6 (surface) and FIG. 7 (cross section).

The SEM photographs were captured using an S-4800 scanning electron microscope made by Hitachi High Technologies, at 100,000× magnification for both the surface photographs and the cross section photographs. The measurement samples for the surface photographs were prepared by cutting cured film samples, which were measured after vapor deposition of carbon onto the surface. The cross section photographs were captured after exposing a face of the samples using a cryo-ultramichrome, and vapor deposition of carbon thereon.

Figure 4:
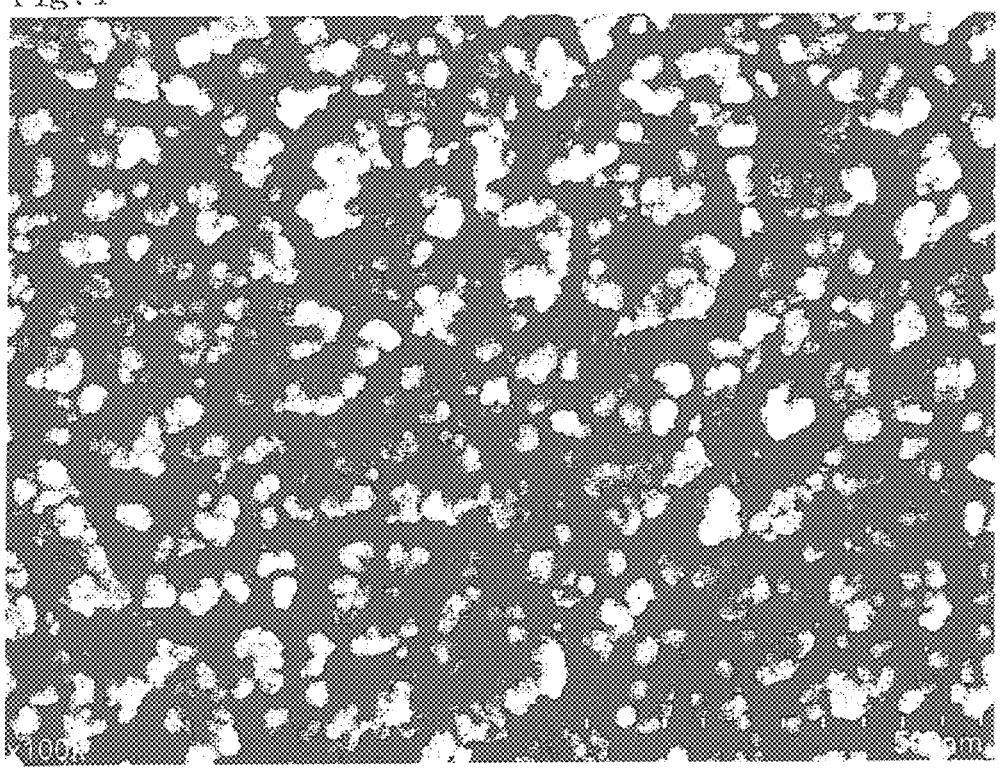
FIG. 4 is an SEM photograph of a surface of a fingerprint-erasing cured film obtained in Working Example 4.

FIG. 4 is an SEM photograph of the surface of a cured film, in which sites that appear whitish are the resin portions. Sites that appear blackish are the solvent evaporation micropores. The shapes of the openings of the solvent evaporation micropores at the surface are indeterminate, and judging from the SEM photograph, are several microns to about 10 μm in size; it was found that these micropores are formed in a substantially uniform distribution on the cured film surface. Because these micropores are of a size not visible to the naked eye, the naked eye can make no distinction from an ordinary matte-processed cured film. From FIG. 5, which is an SEM photograph of a cross section of a cured film, it may be discerned that the micropores communicate with the cured film interior. The fact that substantially all of the micropores are communicating pores was verified by the results of refractive index measurements, disclosed below, which showed that theoretical values and actual measured values of refractive index are substantially in agreement.

The fingerprint-erasing effect of Working Example 4 was rated SS+. Comparative Example 2, which is a cured film which had a solvent content of 0 wt % during curing, specifically, one manufactured simply by matte processing and containing no solvent during curing, had a fingerprint-erasing effect rated NG. As may be seen from the SEM photograph of the surface of the cured film in FIG. 6, the surface of the cured film of Comparative Example 2 was devoid of micropores.

TABLE 1

|  | Solid fraction (wt %) | Fingerprint-erasing ability |
| --- | --- | --- |
| Comparative Example 2 | 100 | NG |
| Working Example 2 | 95 | B |
| Working Example 1 (reposted) | 90 | SS |
| Working Example 3 | 80 | SS+ |
| Working Example 4 | 70 | SS+ |

Working Example 5

When [a procedure] similar to Working Example 1 was followed, except that no sandblasting (matting) process was carried out in (Fabrication of release material), and the fingerprint-erasing effect was evaluated, the result was rated B. It is hypothesized that because the release material is smooth, a smaller number of solvent evaporation micropores form on the cured film surface as compared with the case where the cured film surface has undergone a matting process, so fingerprint-erasing ability is not particularly high.

Working Examples 6 to 14

[A procedure] similar to Working Example 1 was followed, except that in (Preparation of coating liquid), the water-absorbent resin composition of Working Example 1 was changed to those disclosed in Table 2. Results are shown in Table 2.

TABLE 2

| | Additive | Fingerprint-erasing ability |
|---|---|---|
| Working Example 1 (reposted) | PA 5 weight parts | SS |
| Working Example 6 | None added | A |
| Working Example 7 | PA 10 weight parts | SS |
| Working Example 8 | M-510 10 weight parts | A |
| Working Example 9 | BMPTS 20 weight parts | SS+ |
| Working Example 10 | Saturated sodium chloride solution 5 weight parts | S-SS |
| Working Example 11 | Silica gel 5 weight parts | S |
| Working Example 12 | Saturated calcium chloride solution 5 weight parts | S-SS |
| Working Example 13 | Saturated magnesium chloride solution 5 weight parts | S-SS |
| Working Example 14 | Sodium polyacrylate 5 weight parts | S |

In Table 2, PA shows the water-absorbent resin composition employed in Working Example 1; M-510 shows a carboxylic acid-containing oligomer (ARONIX M-510 made by Toagosei Co. Ltd.); BMPTS shows 1-butyl-1-methylpyrrolidinum-bis(trifluoromethylsulfonyl)imide; the silica gel shows one milled to a number-average particle diameter of 2 μm (measured using a VH-6300 digital microscope made by Keyence Corp.) with a planetary ball mill; and the sodium polyacrylate shows a crosslinked sodium polyacrylate (REOJIKKU QG300, made by Nihon Junyaku Co., Ltd.) milled to a number-average particle diameter of 5 μm (measured with microscope) with a planetary ball mill, respectively.

Working Examples 15 and 16

[A procedure] similar to Working Example 1 was followed, except that in (Preparation of coating liquid) of Working Example 1, the included amounts of PETA and M270 were changed to those disclosed in Table 3. Results are shown in Table 3.

TABLE 3

| | PETA:M270 | Fingerprint-erasing ability |
|---|---|---|
| Working Example 1 (reposted) | 55:45 | SS |
| Working Example 15 | 70:30 | B |
| Working Example 16 | 85:15 | C |

Working Examples 17 and 18

[A procedure] similar to Working Example 1 was followed, except that the PETA of Working Example 1 was changed to [the compounds] disclosed in Table 4. Results are shown in Table 4.

TABLE 4

| | Modified component | Fingerprint-erasing ability |
|---|---|---|
| Working Example 1 (reposted) | PETA | SS |
| Working Example 17 | DPHA | SS |
| Working Example 18 | Urethane acrylate | SS |

In Table 4, DPHA shows a penta- to hexafunctional pentaerythritol based ultraviolet curing resin (DPHA: made by Daicel-Cytec Co.); and urethane acrylate shows urethane acrylate (CN-968 made by Sartomer Co.)

Working Examples 19 and 20

[A procedure] similar to Working Example 1 was followed, except that in (Preparation of coating liquid) of Working Example 1, the compounds disclosed in Table 5 were further added to the coating liquid, in amounts of 10 weight parts. Results are shown in Table 5.

TABLE 5

| | Additional component | Fingerprint-erasing ability |
|---|---|---|
| Working Example 19 | IRR214K | SS+ |
| Working Example 20 | IBOA | SS+ |

In Table 5, IRR214K shows tricyclodecane dimethanol diacrylate; and IBOA shows isobornyl acrylate.

Working Examples 21 to 23

[A procedure] similar to Working Example 1 was followed, except that in (Preparation of coating liquid) of Working Example 1, the M270 was substituted by polypropylene glycol urethane diacrylate of molecular weight (polyoxypropylene glycol moiety) of 1000, 2000, or 4000. Results are shown in Table 6.

TABLE 6

| | Molecular weight (PO moiety) | Fingerprint-erasing ability |
|---|---|---|
| Working Example 21 | 1000 | SS |
| Working Example 22 | 2000 | SS+ |
| Working Example 23 | 4000 | SS+ |

Working Examples 24 to 26

[A procedure] similar to Working Example 1 was followed, except that in (Preparation of coating liquid) of Working Example 1, the M270 was substituted by a polypropylene glycol urethane diacrylate dimer of molecular weight (polyoxypropylene glycol moiety) of 1000, 2000, or 4000. Results are shown in Table 7.

TABLE 7

| | Molecular weight (PO moiety) | Fingerprint-erasing ability |
|---|---|---|
| Working Example 24 | 2000 (1000 × 2) | SS+ |
| Working Example 25 | 4000 (2000 × 2) | SS+ |
| Working Example 26 | 8000 (4000 × 2) | SS+ |

Working Examples 27 to 32

[A procedure] similar to Working Example 1 was followed, except that no sandblasting process was carried out in (Fabrication of release material), and (Preparation of coating liquid) was identical to that of Working Examples 21 to 26. Results are shown in Table 8.

TABLE 8

|  | Molecular weight (PO moiety) | Fingerprint-erasing ability |
|---|---|---|
| Working Example 27 | 1000 | B |
| Working Example 28 | 2000 | B-A |
| Working Example 29 | 4000 | B-A |
| Working Example 30 | 2000 (1000 × 2) | A-S |
| Working Example 31 | 4000 (2000 × 2) | S |
| Working Example 32 | 8000 (4000 × 2) | SS |

(Preparation of Polypropylene Glycol Urethane Diacrylate)

The polypropylene glycol urethane diacrylate used in Working Examples 21 to 32 was prepared by a common known synthesis method, in accordance with the component proportions shown in Table 9. Dibutyltin dilaurate was added as a catalyst to the resin component at a level of 250 ppm, and dibutyl hydroxytoluene was added as a polymerization inhibitor to the resin component at a level of 500 ppm. In the case of the polypropylene glycol urethane diacrylate used in Working Examples 24 to 26 and Working Examples 30 to 32, due to high viscosity, the polymerization reaction was carried out after adjusting the solid fraction to 90 wt % employing ethyl 3-ethoxypropionate as a solvent.

TABLE 9

|  | Working Ex. 21 Working Ex. 27 | Working Ex. 22 Working Ex. 28 | Working Ex. 23 Working Ex. 29 | Working Ex. 24 Working Ex. 30 (Note 1) | Working Ex. 25 Working Ex. 31 (Note 1) | Working Ex. 26 Working Ex. 32 (Note 1) |
|---|---|---|---|---|---|---|
| Polypropylene glycol (MW: 1000) | 1000 weight parts | | | 2000 weight parts | | |
| Polypropylene glycol (MW: 2000) | | 2000 weight parts | | | 4000 weight parts | |
| Polypropylene glycol (MW: 4000) | | | 4000 weight parts | | | 8000 weight parts |
| Isophorone diisocyanate (MW: 222.3) | 444.6 weight parts | 444.6 weight parts | 444.6 weight parts | 666.9 weight parts | 666.9 weight parts | 666.9 weight parts |
| 2-Hydroxy-diethyl acrylate (MW: 116.1) | 232.3 weight parts | 232.3 weight parts | 232.3 weight parts | 232.3 weight parts | 232.3 weight parts | 232.3 weight parts |

250 ppm dibutyltin dialaurate added as catalyst to resin component
500 ppm dibutyl hydroxytoluene added as polymerization inhibitor to resin component
(Note 1)
In the case of the target Working Examples, due to the high viscosity of the preparation, reaction was carried at a solid fraction of 90 wt % employing ethyl 3-ethoxypropionate as a solvent.

Working Examples 33 to 35

[A procedure] similar to Working Example 1 and Working Examples 15 and 16 was followed, except that in (Film formation) in Working Example 1 and Working Examples 15 and 16, coating was done so as to give thickness of 10 μm. In addition to the fingerprint-erasing effect, the pencil hardness of the cured films was measured. Measurement of pencil hardness was carried out by method based on JIS K5600-5-4. Results are shown in Table 10.

TABLE 10

|  | Fingerprint-erasing ability | Pencil hardness |
|---|---|---|
| Working Example 1 (reposted) | SS | F |
| Working Example 15 (reposted) | B | H |
| Working Example 16 (reposted) | C | H-2H |
| Working Example 33 | SS | H |
| Working Example 34 | B | 2H |
| Working Example 35 | C | 3H |

Working Examples 36 to 38

(Preparation of Coating Liquid)
[A procedure] similar to (Preparation of coating liquid) of Working Example 1 was followed.
(Provision of Release Material and Substrate)
Black PET (MATTE LUMINA, made by Kimoto Co. Ltd.), steel sheets, and glass sheets were prepared as substrates; and PET film (E5100 made by Toyobo Co. Ltd., thickness 75 μm) was provided as a release material.
(Film Formation)
A polyester urethane based thermal curing type undercoat coating material was coated on the substrate to a dry film thickness of about 1 μm and dried, to carry out an adhesion process. Next, using an apparatus like that shown in FIG. 1, a coating liquid was sandwiched between the substrate and the release material to a thickness of about 5 μm, and irradiated with ultraviolet in an activating energy beam unit to cure the curing resin composition. Thereafter, the release material was peeled from the cured film, leaving the cured film on the substrate. Forced drying was not carried out prior to curing.
(Evaluation of Fingerprint-Erasing Effect)
[A procedure] similar to (Preparation of coating liquid) of Working Example 1 was followed. Results are shown in Table 7. (*3)

TABLE 11

|  | Substrate | Fingerprint-erasing ability |
|---|---|---|
| Working Example 36 | Black PET | B |
| Working Example 37 | Steel sheet | B |
| Working Example 38 | Glass sheet | B |
| Working Example 5 (reposted) | PET | B |

In Working Examples 36 to 38, because a PET release film with a smooth surface was used as the release material, Working Example 5, in which a sandblasting process was not carried out on the release material surface, is reposted in Table 11 as a comparative reference.

Working Example 39

(Preparation of Coating Liquid)
[A procedure] similar to Working Example 1 was followed.
(Provision of Release Material and Substrate)
Two sheets of PET film (E5100 made by Toyobo Co. Ltd., thickness 75 μm) were readied as the substrate and the release material, one of which underwent corona processing (film A), and the other of which did not undergo corona processing (film B). Because the film A employed as the substrate underwent corona processing, cohesion with the cured film was higher than for the film B used as the release material.

(Film Formation)

Using an apparatus like that shown in FIG. 2, a coating liquid was sandwiched between the film A and the film B to a thickness of about 5 μm and irradiated with ultraviolet in an activating energy beam unit, and the release material (film B) was peeled so as to leave the cured film on the substrate (film A). Next, the face from which the film B was peeled was caused to adhere to an adhesive face of a re-releasable adhesive film (GN75 made by PANAC Corp.), and subsequently the film A was peeled from the cured film.

(Evaluation of Fingerprint-Erasing Ability)

[A procedure] similar to (Preparation of coating liquid) of Working Example 1 was followed. The result was rated B.

Working Examples 40 to 52

[A procedure] similar to Working Example 1 was followed, except that the methodology of sandblasting in (Fabrication of release material) of Working Example 1 was modified, to modify the average surface roughness Ra of the cured films obtained thereby in the manner disclosed in Table 12. Results are shown in Table 8 (*4).

TABLE 12

| | Surface condition of cured film | | Fingerprint-erasing ability |
|---|---|---|---|
| | Ra (μm) | Gloss value | SS+ |
| Working Example 40 | 2.8 | 8 | SS+ |
| Working Example 41 | 2.3 | 8 | SS+ |
| Working Example 42 | 2.2 | 9 | SS+ |
| Working Example 43 | 2.1 | 9 | SS+ |
| Working Example 44 | 1.8 | 19 | SS+ |
| Working Example 45 | 1.6 | 20 | SS |
| Working Example 46 | 1.5 | 27 | SS+ |
| Working Example 47 | 1.3 | 30 | SS |
| Working Example 48 | 1.2 | 25 | SS |
| Working Example 49 | 1.0 | 32 | SS |
| Working Example 50 | 0.9 | 40 | S |
| Working Example 51 | 0.7 | 75 | SS |
| Working Example 52 | 0.5 | 94 | S |

In Working Examples 40 to 52, average surface roughness Ra was measured at a depthwise-direction measurement pitch of 0.2 μm over a measurement area of about 750 μm×about 550 μm, employing a laser microscope (VK-8500 made by Keyence Corp.). The gloss values were measured at a 60° measuring angle, employing a GLOSS METER GM-3D made by Murakami Color Research Laboratory Co. Ltd.).

The following refractive index measurement test was carried out as a test to verify that the solvent evaporation pores which had formed on the surface of the cured film are pores communicating with the cured film interior from the cured film surface.

An Abbe refractometer (NAR-IT SOLID) made by Atago Co. Ltd. was employed as the refractometer. Monobromonaphthalene (refractive index 1.656) was employed as the intermediate liquid for measurement of refractive index.

As the method for measuring refractive index, an appropriate amount of the intermediate liquid was dripped [onto the film] to an extent such that the prism of the refractometer was in uniform coherence against the cured film surface, and left for one minute. With regard to measuring temperature, changes in temperature during measurement were avoided. Actual measurements were carried out at room temperature.

The results of verifying the manner in which the refractive index changes depending on the magnitude of void volume, in the case where the intermediate liquid has penetrated into the cured film interior from the openings of the micropores formed at the surface of the cured film, are shown below.

Once the intermediate liquid has penetrated into the micropores, the cured film can be considered as a mixture of a resin solid fraction and the intermediate liquid, the refractive index of which can be estimated by the Lorenz-Lorenz equation. In a case where there are numerous isolated voids, rather than communicating pores, within the cured film, because the intermediate liquid does not penetrate into the void portions and air (refractive index: 1) is present therein, it is conceivable that the actual measured value of refractive index will diverge from the theoretical value.

The Lorenz-Lorenz equation, which is ordinarily used when deriving the refractive index of a mixture, is shown [below] (see Proc. Indian Acad. Sci. (Chem. Sci.), Vol. 115, No. 2, April 2003, pp 147-154).

$$\frac{n^2-1}{n^2+1} = v_1 \frac{n_1^2-1}{n_1^2+2} + v_2 \frac{n_2^2-1}{n_2^2+2}$$ [Equation 1]

$$\phi = v_1\phi_1 + v_2\phi_2$$

$v_1$: volume percentage of resin solid fraction
$v_2$: volume percentage of intermediate liquid
$n_1$: refractive index of resin solid fraction
$n_2$: refractive index of intermediate liquid
$\phi$: refractive index of cured film penetrated by intermediate liquid $\phi=(n^2-1)/(n^2+2)$ The specific gravities of PETA, M-270, the solvent (EEP), and monobromonaphthalene are shown in Table 13. "Wet" refers to individual specific gravities when the coating film is liquid, and "dry" refers to those when the coating film has cured.

TABLE 13

| | Specific gravity (wet) | Specific gravity (dry) |
|---|---|---|
| PETA | 1.18 | 1.365 |
| M-270 | 1.016 | 1.072 |
| EEP | 0.95 | — |
| Monobromonaphthalene | 1.48 | — |

The specific gravity of a 55 wt %:45 wt % mixture of PETA and M-270 was computed by the following calculation. The results are shown in Table 14.

TABLE 14

| | Specific gravity (wet) | Specific gravity (dry) |
|---|---|---|
| PETA:M-270 (55:45) | 1.101 | 1.216 |

The refractive index of a resin solid fraction of 100 wt % in the case of a 55 wt %:45 wt % mixture of PETA and M-270, obtained with an Abbe refractometer, was a value of 1.514 (Comparative Example 3).

In the case of computing a theoretical refractive index, it is necessary to consider the influence of curing shrinkage of the resin solid fraction. During coating film fabrication the resin solid fraction is in liquid form, but subsequent to curing it is a solid, and therefore the specific gravity increases commensurately with curing shrinkage (see Tables 13 and 14). On the other hand, because the solvent does not participate in curing, the volume is basically unchanged. In this case, the volumetric proportion of the resin solid component will decrease, while the volumetric proportion of the solvent will increase.

However, due to shrinkage of the surrounding resin, the volume of the spaces occupied by the solvent also shrinks to a greater or lesser extent, and it is conceivable that, at maximum, shrinkage by an extent comparable to that of the resin solid fraction may arise. In a case where the volume of the spaces occupied by the solvent shrinks by an extent comparable to that of the resin solid fraction, the volumetric proportions of the resin solid fraction and the solvent will be unchanged.

Regarding the influence of curing shrinkage of the resin solid fraction, a case where the volumetric proportions of the resin solid fraction and the solvent are unchanged is considered to be a minimum, and a case where the volumetric proportion of the resin solid fraction has decreased while the volumetric proportion of the solvent has increased is considered to be a maximum.

Results of calculations for the influence of curing shrinkage of the resin solid fraction in a case of PETA:M-270 compositional proportions of 55 wt %:45 wt % and a resin solid fraction of 90 wt % are shown in Table 15.

TABLE 15

| | Influence of resin curing influence at minimum | | | | | Influence of resin curing influence at maxmum | | | | |
|---|---|---|---|---|---|---|---|---|---|---|
| Resin weight (%) | 1.00 | 0.95 | 0.90 | 0.80 | 0.70 | 1.00 | 0.95 | 0.90 | 0.80 | 0.70 |
| EEP weight (%) | 0.00 | 0.05 | 0.10 | 0.20 | 0.30 | 0.00 | 0.05 | 0.10 | 0.20 | 0.30 |
| Filling rate (wet) | 1.000 | 0.943 | 0.886 | 0.775 | 0.668 | 1.000 | 0.937 | 0.876 | 0.758 | 0.646 |
| Void rate (wet) | 0.000 | 0.057 | 0.114 | 0.225 | 0.332 | 0.000 | 0.063 | 0.124 | 0.242 | 0.354 |
| $\emptyset$ | 0.30106 | 0.30487 | 0.30862 | 0.31596 | 0.32307 | 0.30106 | 0.30524 | 0.30931 | 0.31714 | 0.32455 |
| n (theoretical value) | 1.514 | 1.52175 | 1.52943 | 1.54457 | 1.55941 | 1.514 | 1.52252 | 1.53085 | 1.54702 | 1.56253 |

The measuring error of the refractometer employed in the present measurements was ±0.002, but in actual measurements, error of about ±0.003 arose. Below, the refractive indices of various cured films were measured, employing monobromonaphthalene as the intermediate liquid.

Working Examples 53 to 55

[Following a procedure] similar to Working Example 1, except for adjusting the coating liquid by varying the solvent content in Working Example 5 to bring the solid fraction in the coating film during ultraviolet irradiation to the values disclosed in Table 16, the relationship between the solvent content in percentage by weight and the percentage by volume of voids in the cured film was investigated based on the relationship of actual measured values and predicted measured values for refractive index thereof.

TABLE 16

| Solid fraction ratio (wt %) | Matte Fingerprint-erasing abilty | Working or Comparative Ex. | Refractive index Actual | Refractive index Predicted Min. | Refractive index Predicted Max. | Filling rate (vol %) Actual | Filling rate (vol %) Predicted ① | Filling rate (vol %) Predicted ② | Void rate (vol %) Actual | Void rate (vol %) Predicted ① | Void rate (vol %) Predicted ② |
|---|---|---|---|---|---|---|---|---|---|---|---|
| 100 | NG | Cmp. Ex. 2 | 1.514 | 1.514 | 1.514 | 100 | 100 | 100 | 0 | 0 | 0 |
| 95 | B | Wrk. Ex. 2 | 1.522 | 1.522 | 1.523 | 94.1 | 94.3 | 93.7 | 5.9 | 5.7 | 6.3 |
| 90 | SS | Wrk. Ex. 1 | 1.529 | 1.529 | 1.531 | 88.9 | 88.6 | 87.6 | 11.1 | 11.4 | 12.4 |
| 80 | SS+ | Wrk. Ex. 3 | 1.540 | 1.545 | 1.547 | 80.9 | 77.5 | 75.8 | 19.1 | 22.5 | 24.2 |
| 70 | SS+ | Wrk. Ex. 4 | 1.553 | 1.559 | 1.563 | 71.4 | 66.8 | 64.6 | 28.6 | 33.2 | 35.4 |

| Solid fraction ratio (wt %) | Clear Fingerprint-erasing abilty | Working or Comparative Ex. | Refractive index Actual | Refractive index Predicted Min. | Refractive index Predicted Max. | Filling rate (vol %) Actual | Filling rate (vol %) Predicted ① | Filling rate (vol %) Predicted ② | Void rate (vol %) Actual | Void rate (vol %) Predicted ① | Void rate (vol %) Predicted ② |
|---|---|---|---|---|---|---|---|---|---|---|---|
| 100 | NG | Cmp. Ex. 3 | 1.514 | 1.514 | 1.514 | 100 | 100 | 100 | 0 | 0 | 0 |
| 95 | C | Wrk. Ex. 53 | 1.522 | 1.522 | 1.523 | 94.1 | 94.2 | 93.7 | 5.9 | 5.8 | 6.3 |
| 90 | B | Wrk. Ex. 5 | 1.529 | 1.529 | 1.531 | 88.9 | 88.5 | 87.6 | 11.1 | 11.5 | 12.4 |
| 80 | B-A | Wrk. Ex. 54 | 1.540 | 1.543 | 1.547 | 80.9 | 77.4 | 75.8 | 19.1 | 22.6 | 24.2 |
| 70 | A | Wrk. Ex. 55 | 1.553 | 1.559 | 1.563 | 71.4 | 66.7 | 64.6 | 28.6 | 33.3 | 35.4 |

Results are as shown in Table 16 above. The results were that, at a resin solid fraction ratio of 90 wt % or above prior to curing, there was good agreement between actual measured values and predicted values of refractive index, irrespective of the influence of curing shrinkage of the resin solid fraction; whereas at 80 wt % and below, actual measured values progressively fell below predicted values. These results show that, at a resin solid fraction ratio of 90 wt % or above, the micropores which open on the surface of the cured film are substantially all in communication with the interior from the surface. It was verified that at a resin solid fraction ratio of 80 wt % or below, isolated voids progressively start to be present within the cured film, separately from the micropores which communicate with the cured film surface.

Provided that the surface shape of a cured film is a matte shape of an extent such that such that the prism of the refractometer is in uniform coherence against the cured film surface via the intermediate liquid, actual measured values of refractive index will agree for both matte and clear (smooth) surface shapes of cured films.

Actual measured values of refractive index [show that] in cases where there exists a void rate of 6 vol % or above of micropores communicating from the surface of the cured film, fingerprint-erasing ability is exhibited both by matte and clear (smooth) surface shapes of cured films, with the fingerprint-erasing effect improving with a rise in the void rate; and in the case of matte profiles, fingerprint-erasing ability is high even with a large solid fraction ratio (low solvent content), thereby making it easy to attain a balance between mechanical strength and fingerprint-erasing effect.

Figure 9:
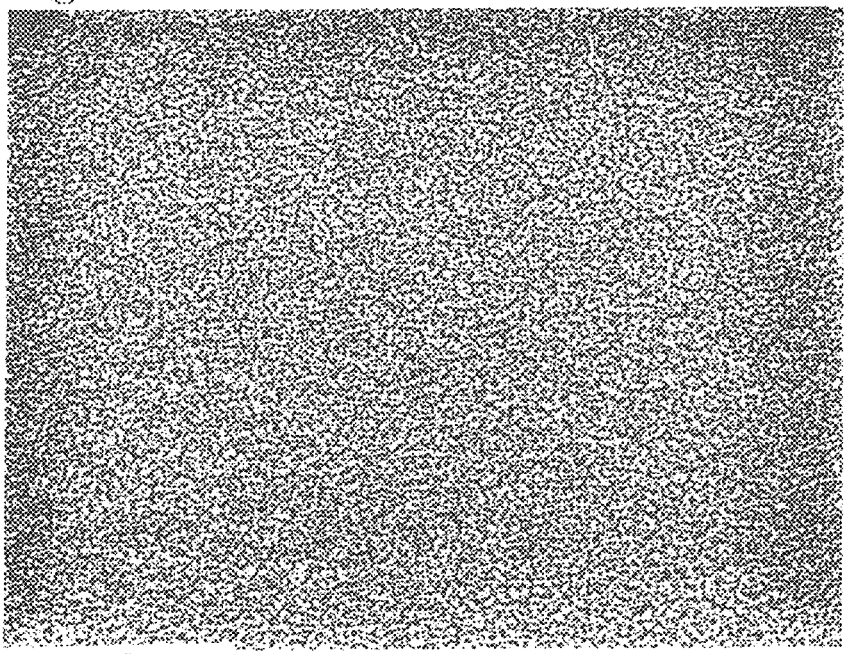
FIG. 9 is an SEM image of the surface of a film B.
Figure 10:
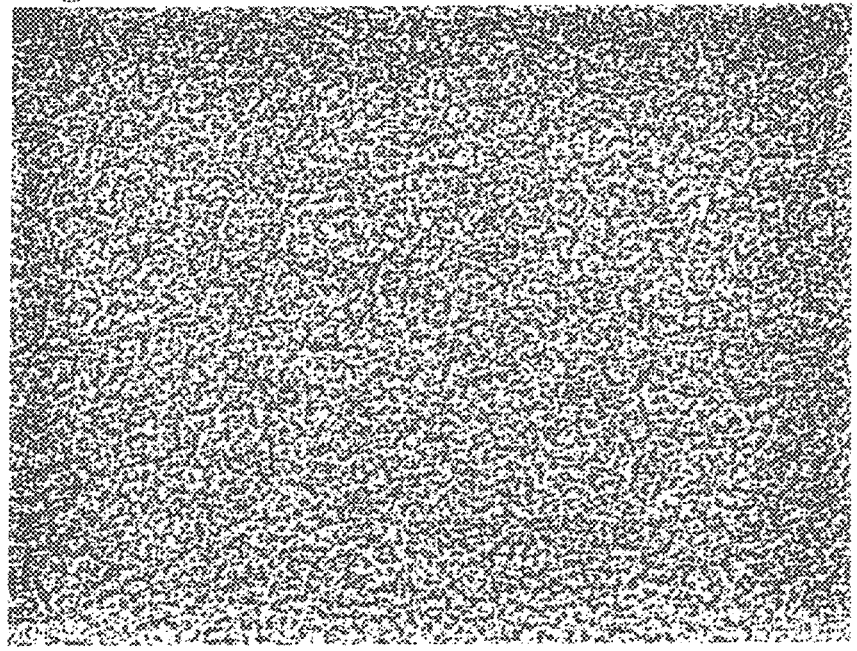
FIG. 10 is an SEM image of the surface of a film C.
Figure 11:
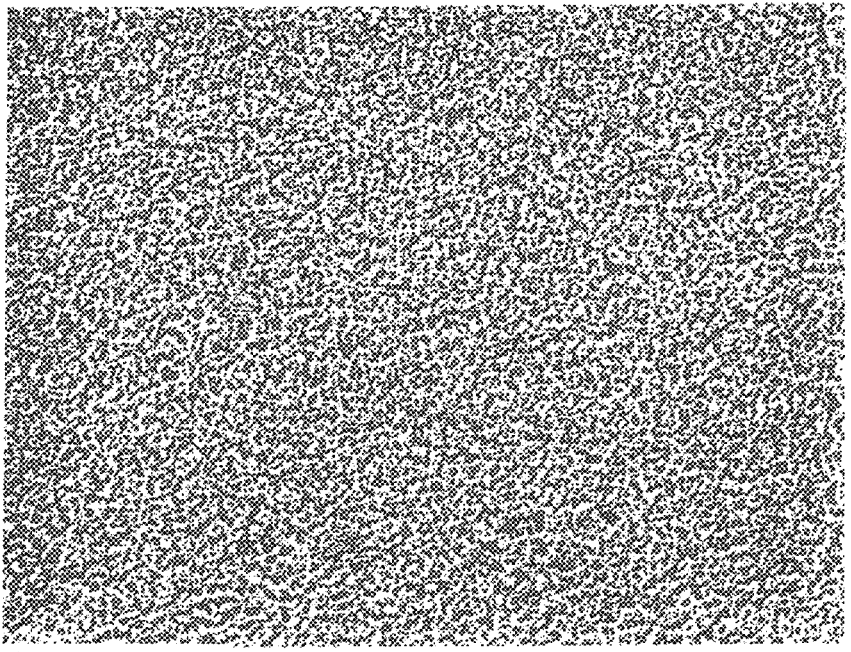
FIG. 11 is an SEM image of the surface of a film D.

Employing an S-4800 scanning electron microscope (made by Hitachi High Technologies), the surfaces of cured films obtained by varying the solid fraction ratio from 100 wt % to 70 wt % while holding the PETA:M270 compositional proportions constant at 55 wt %:45 wt % (Working Examples 1 to 3, Comparative Example 2) were imaged at 30,000× magnification. These are shown in FIG. 8 to FIG. 11. The photographs at top and bottom in each figure are, respectively, 30,000× photographs taken of the center section of the measured sample, and of a region 3 cm away therefrom. FIG. 9 is an SEM photograph of a cured film formed with a solid fraction of 90 wt %, and a multitude of micropores opening on the cured film surface are clearly observed. A comparison with FIGS. 10 and 11 clearly shows that as solvent content increases, the pore diameter and quantity of voids in the cured film increases.

Working Examples 56 and 57

Figure 12:
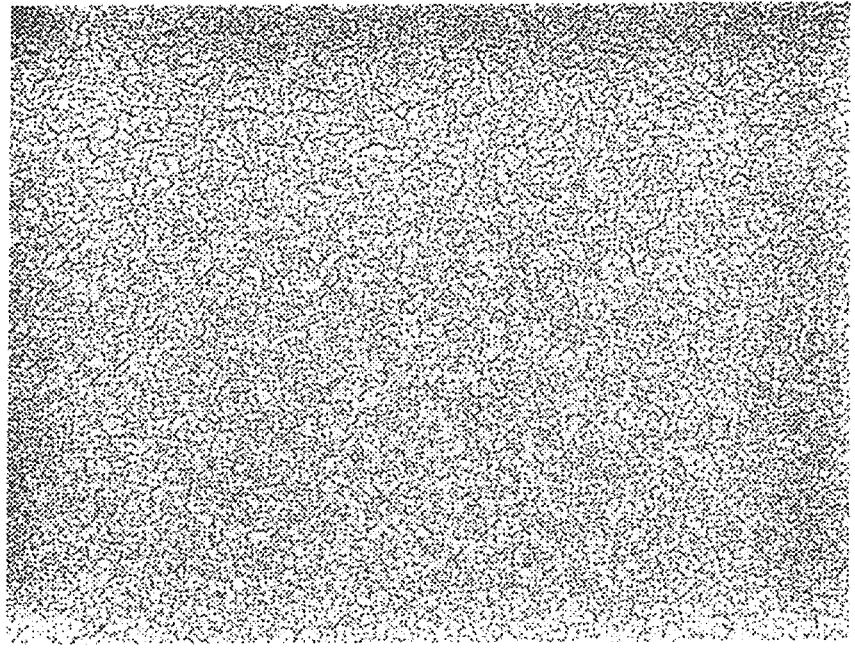
FIG. 12 is an SEM image of the surface of a film E.
Figure 13:
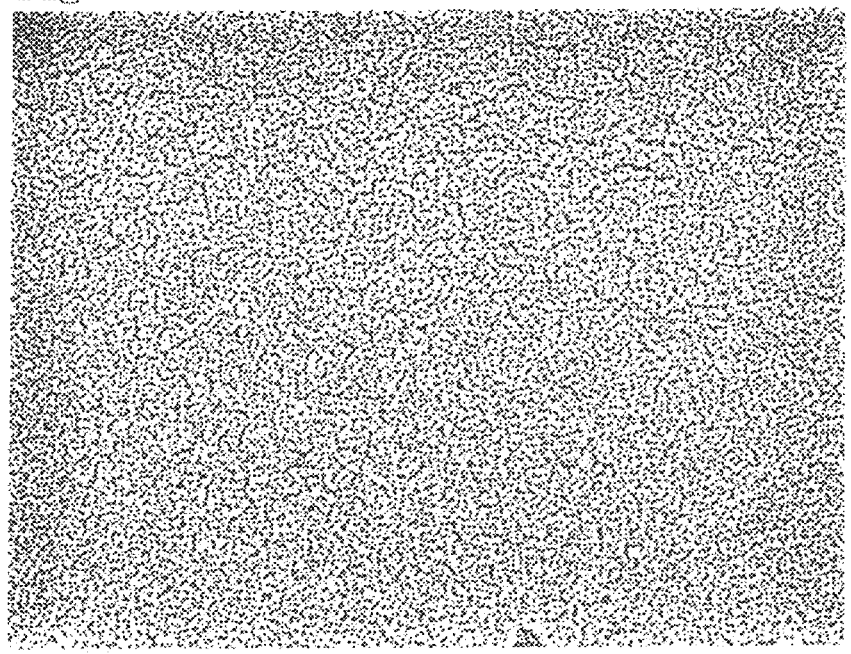
FIG. 13 is an SEM image of the surface of a film F.

FIG. 12 and FIG. 13 are photographs of the surfaces of cured films obtained with PETA:M270 compositional proportions of 85 wt %:15 wt %, and solid fraction ratios of 90 wt % and 80 wt %. In accordance with decreasing solid fraction ratio, specifically, increasing solvent ratio, solvent evaporation pores increased, and fingerprint-erasing ability was higher.

In the case of Working Example 2 in Table 16, the solid fraction ratio was 95 wt % and the solvent was 5 wt %; volumetric conversion on the basis of specific gravity gives a void rate of 5.9 (about 6) vol %. Therefore, 6 vol (*5) or above increases the fingerprint-erasing ability.

INDUSTRIAL APPLICABILITY

The fingerprint-erasing cured film of the present invention renders fingerprint soiling not readily visible or no longer visible within a short period of time, e.g., 5 minutes or 2 minutes, and affords singularly improved aesthetics in displays of electronic devices using this cured film, and particularly on surfaces of touch panel type displays and members. Also, by manufacturing a fingerprint-erasing cured film between two release films of differing adhesive force, the fingerprint-erasing cured film can be manufactured on any surface, by a simple method.

The invention claimed is:
1. A method for manufacturing a fingerprint-erasing cured film, comprising the following manufacturing steps performed in the order set forth as follows:
    forming a liquid coating film including at least a resin-forming composition, a waterabsorbent compound and a solvent, wherein:
    the resin-forming composition is polymerizable by an activating energy beam;
    the water-absorbent compound is one or two or more compounds selected from the group consisting of water-absorbent resins, oligomers containing carboxyl groups, ionic liquids, water-absorbent inorganic salts or an aqueous solution thereof, and silica gel microparticles; the water-absorbent compound is added in an amount of 0.4 to 25 wt % with respect to 100 wt % of the solid fraction of the resin-forming composition within the liquid coating film;
    and the solvent content of the liquid coating film is 5 wt % or more and 30 wt % or less;
    curing said liquid coating film by irradiating the resin-forming composition within the liquid coating film with an activating energy while some or all of the solvent is included within the coating liquid film; said curing causing to be created within the cured film a multitude of micropores which open onto a surface of the cured film and which communicate with the cured film interior; and drying the cured film; the micropores facilitating fingerprint-erasing ability of the cured coating film.

2. The method for manufacturing the fingerprint-erasing cured film according to claim 1, wherein said curing of the liquid coating film occurs in a state of the liquid coating film being sandwiched between a substrate and a release material, whereby a cured film is formed on the substrate.

3. The method for manufacturing the fingerprint-erasing cured film according to claim 2, wherein the release material is a release material having a surface with surface asperities formed by matte processing; said surface facing the liquid coating film when the liquid coating film is sandwiched between the substrate and the release material.

\* \* \* \* \*